United States Patent [19]

Iwahashi et al.

[11] Patent Number: 4,945,440
[45] Date of Patent: Jul. 31, 1990

[54] TAPE CASSETTE WITH TRANSPARENT REEL VIEWING WINDOWS AND LAMINATED THREE-COLOR CONSTRUCTION

[75] Inventors: Yuji Iwahashi; Kiyoshi Urayama; Shinya Sato, all of Miyagi, Japan

[73] Assignee: Sony Corporation, Tokyo, Japan

[21] Appl. No.: 195,876

[22] Filed: May 19, 1988

[30] Foreign Application Priority Data

Sep. 29, 1987 [JP] Japan ............................ 62-84196[U]

[51] Int. Cl.⁵ ............................................ G11B 23/08
[52] U.S. Cl. .................................................... 360/132
[58] Field of Search ................. 360/132; 242/198, 199

[56] References Cited

U.S. PATENT DOCUMENTS 4,553,717 11/1985 Takagi ................................. 360/132
4,688,128 8/1987 Shiba et al. ......................... 360/132

FOREIGN PATENT DOCUMENTS 0073010 2/1984 European Pat. Off. .
0152693 2/1985 European Pat. Off. .
2134076 8/1984 United Kingdom .
2162495 2/1986 United Kingdom .

*Primary Examiner*—Robert S. Tupper
*Attorney, Agent, or Firm*—Hill, Van Santen, Steadman & Simpson

[57] ABSTRACT

A tape cassette for video or audio units which consists of a housing having an upper half and a lower half, the upper half being composed mainly of an opaque material, the upper half having a transparent window portion on the upper wall thereof. A cover portion is laminated to the upper half, the cover portion being composed of a transparent material, the window portion consisting of a single layer of the transparent material, with an additional portion of the upper half formed of a double layer of the transparent material and the opaque material.

1 Claim, 2 Drawing Sheets

TAPE CASSETTE WITH TRANSPARENT REEL VIEWING WINDOWS AND LAMINATED THREE-COLOR CONSTRUCTION

BACKGROUND OF THE INVENTION

1. Field of the Invention

The present invention relates generally to tape cassettes and, more particularly, to a tape cassette having different light transmission properties along its upper half.

2. Description of the Prior Art

A typical tape cassette is disclosed, for example, in U.S. Pat. No. 4,672,498 which issued on June 9, 1987. In this conventional tape cassette, there is provided a cassette housing formed of a lower half and an upper half molded of a transparent synthetic resin. Reel hubs are incorporated into the cassette housing to carry a wound magnetic tape. The upper half is molded of an opaque synthetic resin such as a colored or smoked synthetic resin except for window portions through which the reel hubs can be visually observed.

The aforementioned conventional tape cassette has a housing which is molded of a single layer structure. There is also a known tape cassette having a housing of a double layer structure. This latter type is disclosed in Japanese Laid Open utility model application no. 60-12875. In this latter tape cassette, the whole surface of the cassette half is molded of the inner wall material and an outer wall material of the same or different kind of plastic material by a laminate dichromatic molding process as a unitary structure, thereby form the cassette housing.

In the first mentioned tape cassette, only the base portion and the window portion of the cassette housing are distinguished from each other while in the latter mentioned type cassette, the base portion of the cassette housing is formed of inner and outer walls which are laminated over the entire surface so that the tape cassette has a uniform color. Thus, both of the tape cassettes described provide only two color tones on the base portion and the window portion of the cassette housing so that the above-mentioned conventional tape cassettes are limited in terms of providing a visually attractive design.

SUMMARY OF THE INVENTION

The present invention provides an improved tape cassette which overcomes the defects present in the prior art. The cassette can present three color tones by using two kinds of materials, an opaque material and a transparent material, thus achieving an improved effect from a design standpoint.

Another feature of the present invention provides a tape cassette in which a substantial portion of the cover is prevented from being scratched while being transported on a belt conveyor on a production line.

The tape cassette of the present invention is suitable for use with an 8 mm video tape recorder and other tape cassettes for apparatus for reproducing and recording audio signals.

The present invention provides a tape cassette having a housing consisting of an upper half and a lower half, the upper half being composed mainly of an opaque material. The upper half has a transparent window portion on the upper wall thereof, and a cover portion is laminated to the upper half, the cover portion being composed of a transparent material, the window portion constituting a single layer of this transparent material, with an additional portion of the upper half being formed of a double layer of transparent material and opaque material.

Other objects, features and advantages of the present invention will become apparent from the following detailed description of the preferred embodiment taken in conjunction with the accompanying drawings, in which like reference numerals identify the same or similar parts.

DESCRIPTION OF THE PREFERRED EMBODIMENTS

An embodiment of a tape cassette according to the present invention will now be described with reference to the drawings.

Figure 1:
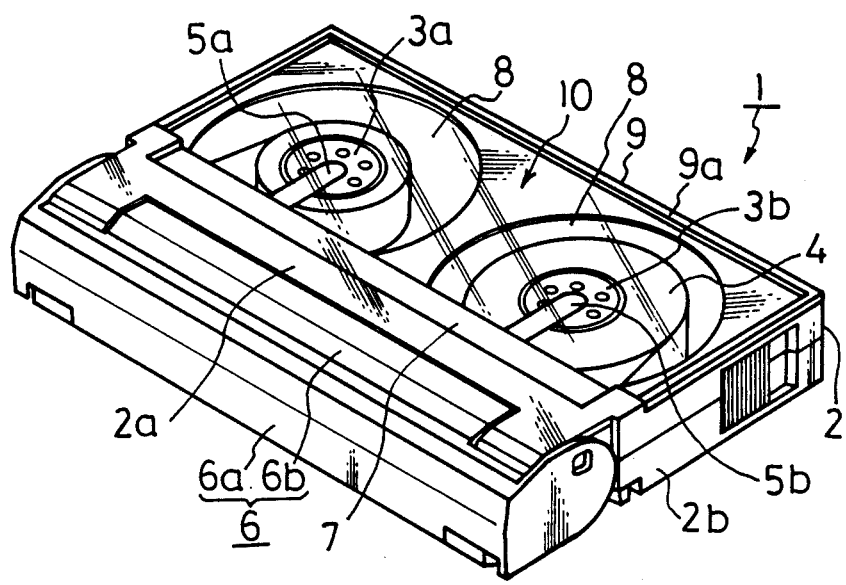
FIG. 1 is a perspective view of one embodiment of a tape cassette the present invention.

FIG. 1 shows an overall arrangement of one embodiment of a tape cassette according to this invention. In this embodiment, a tape cassette 1 is of the type used for an 8 mm video tape recorder. As shown in FIG. 1, a cassette housing 2 comprises an upper section or half 2a and a lower section or half 2b which are made of an opaque material, for example, an acrylonitrile-butadiene-styrene copolymer (ABS) and secured together by suitable means such as screws (not shown). A pair of reel hubs 3a and 3b are rotatably mounted in the cassette housing 2, and a magnetic tape 4 is wound on the reel hubs 3a and 3b for transport therebetween. Leaf springs 5a and 5b are provided to facilitate the rotation of the reel hubs 3a and 3b with limited axial travel. The magnetic tape 4 wound on the reel hubs 3a and 3b is withdrawn up to the front wall of the cassette housing 2 by means of tape guides (not shown). The front wall of the cassette housing 2 into which the magnetic tape 4 is withdrawn is generally covered with a front lid 6 formed of two sections 6a and 6b. The front lid 6 is pivotably mounted on the front portion of the cassette housing 2 so as to selectively open or close the front access opening of the cassette housing 2. During use, the front lid 6 is rotated upwardly to guide the magnetic tape 4 to the front wall of the cassette housing 2. These structural features are substantially the same as those shown in U.S. Pat. No. 4,418,373 and therefore will not be described in detail.

A label area 7 of substantially rectangular configuration is formed approximately centrally in the longitudinal direction of the upper wall of the upper half 2a and extends nearly over the entire width in the transverse direction of the upper half 2a. The label area 7 is depressed with respect to the upper wall of the upper half 2a, whereby a label with data concerning the recording may be put on the label area 7 by conventional means such as an adhesive agent or the like.

A window portion 8 is formed adjacent to the label area 7 in a portion of the upper wall of the upper half 2a. The window portion 8 is composed of a transparent synthetic resin so that the amount of magnetic tape 4 wound on the reel hubs 3a and 3b can be visually observed through the transparent window portion 8. In the drawings, conventional transparent flanged tape reels integrally formed with the reel hubs 3a and 3b are not shown for purposes of clarity.

Within the cassette housing 2 there can be provided an optical member such as an end sensor for detecting the end of the tape, a base portion for mounting the leaf springs 5a and 5b, reel braking members and other conventional mechanisms found in a tape cassette. These members are all located at positions which are hidden by the base portion of the upper half 2a composed of opaque material so that they cannot be visually observed from the outside.

Figure 2:
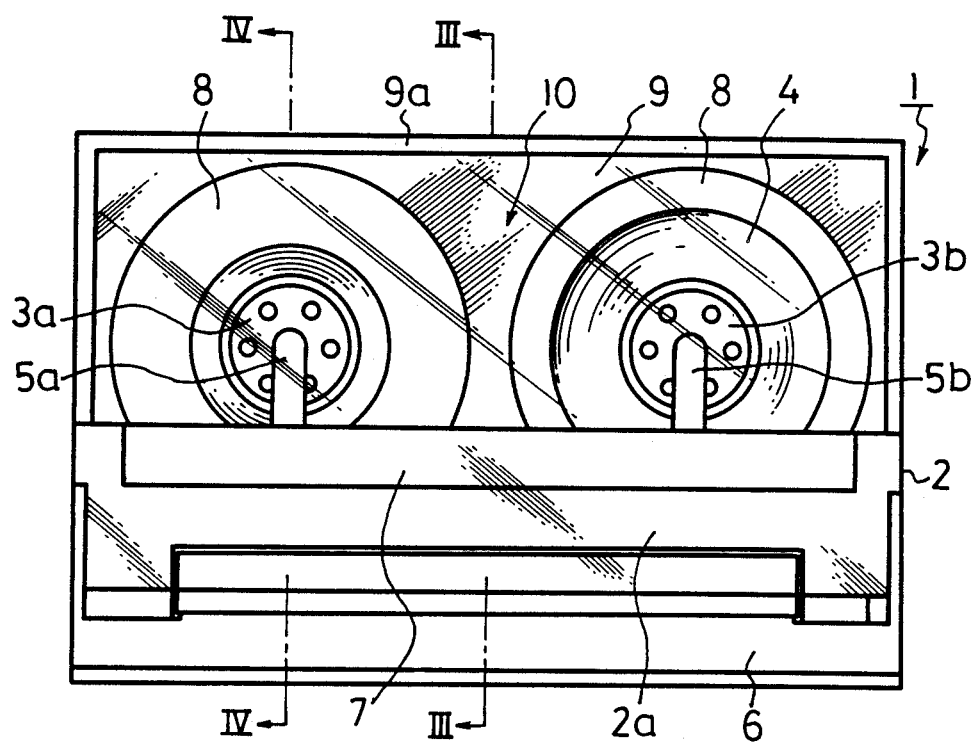
FIG. 2 is a plan view of a tape cassette shown in FIG. 1.
Figure 3:
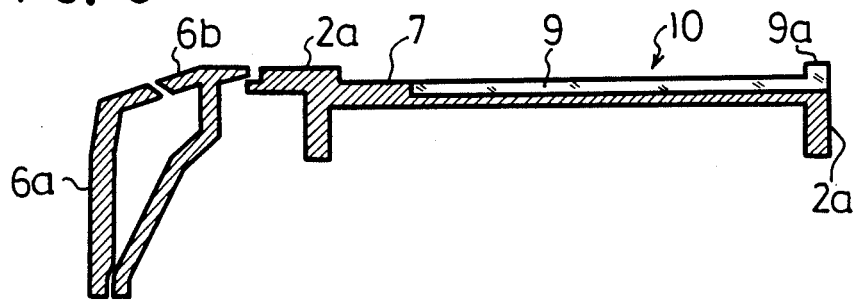
FIG. 3 is a cross-sectional view taken along the line III—III of FIG. 2, looking in the direction of the arrows.
Figure 4:
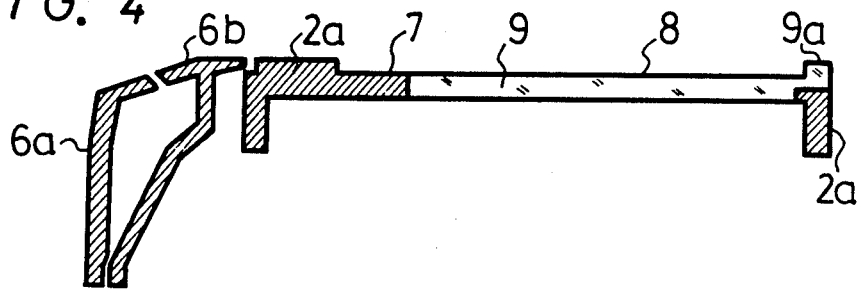
FIG. 4 is a cross-sectional view along the line IV—IV of FIG. 2, looking in the direction of the arrows.

In the thus described tape cassette, the window portion 8 is formed as follows. As shown in FIGS. 2-4, the second half portion of the top wall of the upper half 2a is a laminated portion identified at reference numeral 10, and comprising the base portion of the upper half 2a and an outer wall portion 9. The outer wall portion 9 consists of a laminate of transparent material and opaque material in a double layer. The outer wall portion 9 is formed of a thin, colored or smoked plate of acrylic resin, as shown in FIG. 3, and a portion of the upper half 2a is formed of a single thickness of transparent material to provide a window portion 8 as shown in FIG. 4.

The window portion 8 is a circular window in which the radius is substantially the same as the maximum radius of the magnetic tape 4 which is to be wound on the reel hubs 3a and 3b. Laminated portion 10 has a marginal edge portion 9a which projects upwardly to form a frame, with the plane of the window portion 8 being at a relieved position from the reference plane of the top wall of the upper half 2a. In other words, the plane of the window portion 8 is flush with the plane of the label area 7.

Figure 5A:
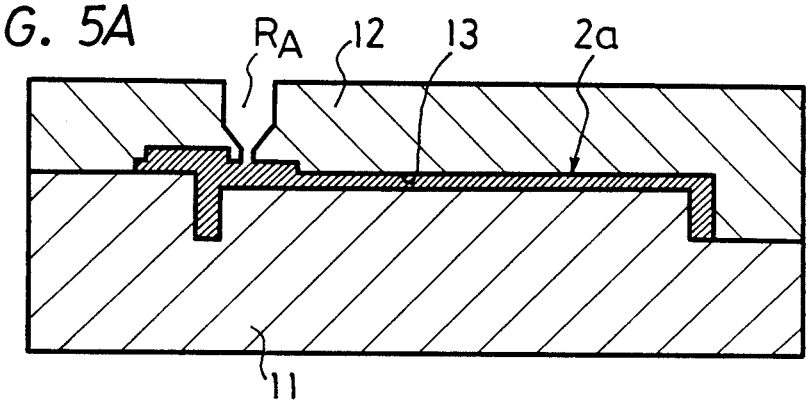
FIGS. 5A and 5B are enlarged, vertical sectional fragmentary views of the upper and lower mold sections for manufacturing a tape cassette according to the present invention.
Figure 5B:
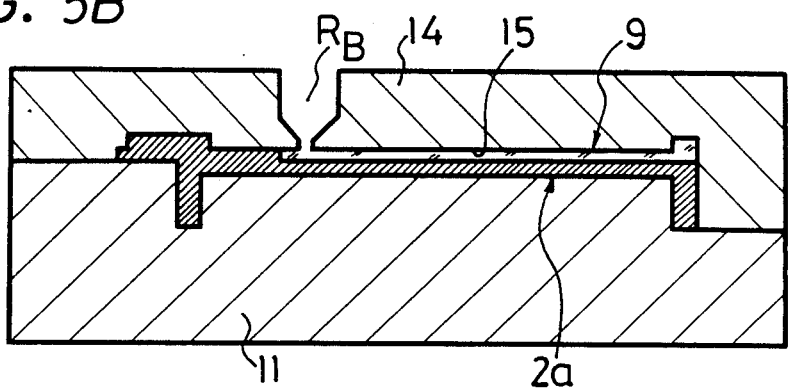

The upper half 2a is molded by the injection of synthetic resin in a laminate dichromatic molding process. This process will be described with reference to the enlarged, vertically-sectioned fragmentary cross sectional views constituting FIGS. 5A and 5B. FIGS. 5A and 5B both correspond to FIG. 3.

As shown in FIG. 5A, a lower stationary mold section 11 and an upper mold section 12 are connected to provide a primary mold cavity 13 in which the base portion of the upper half 2A is molded. An opaque acrylonitrile-butadiene-styrene copolymer is injected through a resin injection gate or runner $R_A$ into the primary mold cavity 13 in which the primary molding is effected to mold the base portion of the upper half 2a as illustrated in FIG. 5A.

After the acrylonitrile-butadiene-styrene copolymer in the priamary mold cavity 13 is quenched and solidified, both the mold sections 11 and 12 are detached. Then the stationary mold section 11 carrying thereon the base portion of the upper half 2a formed by the primary molding is moved beneath a mold section 14 for a secondary molding operation and the sections are combined to form a secondary mold cavity 15 for molding the outer wall portion 9. An acrylic resin which may be smoke colored is injected through a resin injection gate or runner $R_B$ into the secondary mold cavity 15 in which the secondary molding is carried out as illustrated in FIG. 5B to mold the outer wall portion 9 on the base portion on the upper half 2a in a laminated fashion, and also forming the window portion 8.

Since the outer wall portion or the cover portion 9 formed of the smoked transparent material is laminated on the upper half 2a of the cassette housing 2 composed of opaque material and the upper half 2a is partially formed of only the outer wall portion 9 which forms the window portion 8, three color tones can be presented by the base portion of the cassette housing 2, the window portion 8 and the laminated portion 10 at the periphery of the window portion 8. The base portion of the cassette housing 2 presents a color tone of opaque material itself and the window portion presents a smoked transparent color tone. In addition, in the laminated portion 10 the color of the base portion of the upper half 2a is seen through the smoked outer wall portion 9 so that the laminated portion presents a color tone different from the above two colors, so that three different kinds of color tones are presented in total. In other words, the cassette 1 can achieve the same effects as those achieved by using three materials of different colors through the use of two materials consisting of the opaque material and the smoked transparent material.

In the embodiment of the invention shown in the drawings, the outer wall portion 9 of the laminated portion 10 is composed of a hard acrylic resin and has an edge portion 9a at the margin to form a frame-like portion, so that the plane of the window portion is separated therefrom by one small step. The window portion 8 is thus prevented from being scratched by lateral forces while being transported on a belt conveyor on the production line. Thus, the quality of the tape cassette 1 can be protected from being degraded.

Furthermore, since in the tape cassette of the present invention the window portions 8 are formed at the portions with a radius corresponding to the maximum radius of the magnetic tape 4 wound on the reel hubs 3a and 3b, the interface area between the base portion of the upper half 2a and the outer wall portion 9 is comparatively large in the laminated portion 10, thus assuring sufficient joint strength therebetween.

In the above-described embodiment, the outer wall portion 9 is tinted in a smoked color, but the outer wall portion 9 may be made of a transparent material otherwise tinted. Also, because of the reflection and refraction of light, the laminated portion 10 presents a color tone different from the colors of the base portion and of the window portion 8 of the cassette housing 2 so that three color tones can be present similarly to the above described embodiment.

The present invention is also applicable to tap cassettes of not only the 8 mm video tape recorder variety but also to tape cassettes of recording and/or reproducing apparatus of other types for recording and/or reproducing an audio signal.

The above description is presented by way of example of a single preferred embodiment of the invention and it will be apparent that many modifications and variations can be effected by one of ordinary skill in the art without departing from the spirit and scope of the novel concepts of the invention so that the scope of the invention should be determined only by the appended claims.

We claim:

1. A tape cassette comprising:

a housing consisting of an upper half and a lower half,
said upper half being composed mainly of an opaque material,
said upper half having a through-hole window portion without any material on the upper wall thereof,
a cover portion laminated on the part of outside surface of said upper half, said cover portion being composed of a transparent material, said window portion being filled up by a single layer of said transparent material, an additional portion of said upper half surrounding the periphery of said window portion and being formed of a double layer of said transparent material on the outside surface of said opaque material, and a remaining portion of said upper half being formed by single layer of said opaque material, whereby said opaque material in said additional portion can be seen through said transparent material; and wherein said cover portion has a raised peripheral edge to prevent scratching of said cover portion by lateral forces.

* * * * *